US012476055B2

(12) United States Patent
Kim et al.

(10) Patent No.: US 12,476,055 B2
(45) **Date of Patent: *Nov. 18, 2025**

(54) EARTHING SWITCH

(71) Applicant: Hyundai Electric & Energy Systems Co., Ltd., Seoul (KR)

(72) Inventors: Keon Woo Kim, Seoul (KR); Ji Hoon Kim, Seoul (KR); Seung Hwan Baik, Seoul (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 151 days.

This patent is subject to a terminal disclaimer.

(21) Appl. No.: 18/185,875

(22) Filed: Mar. 17, 2023

(65) Prior Publication Data

US 2024/0312732 A1 Sep. 19, 2024

(51) Int. Cl.

| | |
|---|---|
| ***H01H 1/14*** | (2006.01) |
| ***H01H 9/02*** | (2006.01) |
| ***H01H 9/30*** | (2006.01) |

(52) U.S. Cl.

CPC ................ *H01H 9/02* (2013.01); *H01H 1/14* (2013.01); *H01H 9/30* (2013.01)

(58) Field of Classification Search

CPC ............. H01H 9/02; H01H 9/12; H01H 9/30; H01H 1/14; H01H 1/38; H01H 1/385; H01H 33/56; H01H 33/7038; H01H 33/7023; H01H 25/002

USPC ...... 200/293, 50.38, 50.39, 243; 218/12, 13, 218/31, 45, 55, 59–61, 43, 46, 79, 80, 88, 218/100

See application file for complete search history.

(56) References Cited

U.S. PATENT DOCUMENTS 4,427,858 A * 1/1984 Fehr ..................... H01H 31/003 218/19
5,543,597 A * 8/1996 Watanabe ............ H01H 31/003 218/59
7,122,758 B2 * 10/2006 Schweizer ........... H01H 31/003 218/79
8,890,009 B2 * 11/2014 Nitert ........................ H01H 3/38 200/48 R (Continued)

FOREIGN PATENT DOCUMENTS

CN 106384961 B 7/2018
CN 114974995 * 8/2022 ............. H01H 33/91

(Continued)

OTHER PUBLICATIONS

Translation of CN114974995 (Original document published Aug. 30, 2022). (Year: 2022).*

(Continued)

*Primary Examiner* — William A Bolton

(74) *Attorney, Agent, or Firm* — Dority & Manning, P.A.

(57) ABSTRACT

An earthing switch includes a fixed contact part fixed in an enclosure, a movable contact part disposed to face the fixed contact part, having a hollow portion formed therein, and having one end portion connected to a driving device and driven by the driving device so that the other end portion thereof is connected to or separated from the fixed contact part, and a piston part located in the hollow portion and moving relative to the movable contact part, wherein the hollow portion extends in a longitudinal direction of the movable contact part, both end portions of the hollow portion are formed to be open in the longitudinal direction.

8 Claims, 7 Drawing Sheets

(56) References Cited

U.S. PATENT DOCUMENTS

| | | | | |
|---|---|---|---|---|
| 10,354,819 | B2 * | 7/2019 | Gery | H01H 33/56 |
| 11,031,192 | B2 * | 6/2021 | Kubota | H01H 31/02 |
| 12,057,278 | B2 | 8/2024 | Sato et al. | |
| 2005/0189326 | A1 | 9/2005 | Moser et al. | |
| 2007/0246444 | A1 * | 10/2007 | Saxl | H01H 1/385 218/16 |
| 2008/0203346 | A1 | 8/2008 | Shu | |
| 2012/0061352 | A1 | 3/2012 | Shimizu et al. | |
| 2013/0020286 | A1 | 1/2013 | Yeon et al. | |
| 2017/0236657 | A1 | 8/2017 | Kim | |
| 2019/0362917 | A1 | 11/2019 | Monka et al. | |
| 2021/0074496 | A1 | 3/2021 | Ishikawa et al. | |
| 2021/0082644 | A1 | 3/2021 | Kotsuji et al. | |
| 2021/0320481 | A1 | 10/2021 | Kim et al. | |
| 2023/0223224 | A1 * | 7/2023 | Kieffel | H01H 33/22 218/90 |

FOREIGN PATENT DOCUMENTS

| | | | |
|---|---|---|---|
| EP | 0665565 | A2 | 8/1995 |
| EP | 3477675 | A1 | 5/2019 |
| JP | H 05053094 | U | 7/1993 |
| JP | H 08329800 | A | 12/1996 |
| JP | H 10269912 | A | 10/1998 |
| JP | 4522490 | B1 | 8/2010 |
| JP | 2018098128 | A | 6/2018 |
| KR | 101919125 | B1 | 11/2018 |
| KR | 102135381 | B1 | 7/2020 |
| WO | WO2018114204 | A | 6/2018 |

OTHER PUBLICATIONS

European Search Report for corresponding Application No. 23162656.5, dated Sep. 11, 2023, 5 pages.
Korean Search Report for corresponding Application No. 10-2021-0145270, 8 pages.
Saudi Arabian Examination Report for corresponding Application No. 123446598, dated Jul. 15, 2024, 10 pages.
Korean Search Report for corresponding Application No. 10-2021-0148747, dated May 4, 2022, 10 pages.
European Search Report for corresponding Application No. EP23160179, dated Sep. 11, 2023, 5 pages.

* cited by examiner

| TEST NO. | | RT19A1100770 | | | | | |
|---|---|---|---|---|---|---|---|
| | | 019 | 020 | 021 | 022 | 023 | 024 |
| OPERATING DUTY | | CO | CO | CO | CO | CO | CO |
| TEST VOLTAGE (RELATIVE TIME) | kV | 2.0<br>2.0<br>2.0 | 2.0<br>2.0<br>2.0 | 2.0<br>2.0<br>2.0 | 2.0<br>2.0<br>2.0 | 2.0<br>2.0<br>2.0 | 2.0<br>2.0<br>2.0 |
| TEST CURRENT | A | 84.3<br>84.5<br>84.7 | 84.3<br>84.5<br>84.7 | 84.3<br>84.5<br>84.7 | 84.3<br>84.5<br>84.7 | 84.3<br>84.5<br>84.7 | 84.3<br>84.5<br>84.7 |
| ARCING TIME | ms | 5.2<br>10.8<br>7.9 | 5.7<br>11.3<br>8.4 | 1.4<br>6.7<br>4.0 | 7.0<br>4.5<br>10.0 | 12.0<br>2.3<br>6.9 | 5.3<br>2.6<br>8.0 |
| BREAK TIME | ms | 3 062<br>3 069<br>3 065 | 3 063<br>3 069<br>3 066 | 3 056<br>3 060<br>3 059 | 3 046<br>3 043<br>3 048 | 3 062<br>3 059<br>3 057 | 3 038<br>3 036<br>3 041 |
| PEAK VALUE OF TRV | kV | -4.7<br>-5.1<br>+5.0 | -4.7<br>-5.1<br>+5.0 | +4.5<br>+4.8<br>-4.7 | -4.7<br>+4.3<br>+4.8 | -4.8<br>+4.8<br>-4.6 | +4.7<br>-4.3<br>-4.9 |
| SUPPLIED VOLTAGE,CLOSING(DC) | V | 106.25 | 106.25 | 106.25 | 106.25 | 106.25 | 106.25 |
| SUPPLIED VOLTAGE,OPENING(DC) | V | 106.25 | 106.25 | 106.25 | 106.25 | 106.25 | 106.25 |
| GAS PRESSURE(gauge) | MPa | 0.45 | 0.45 | 0.45 | 0.45 | 0.45 | 0.45 |
| OPERATING PRESSURE(gauge) | MPa | N.A. | N.A. | N.A. | N.A. | N.A. | N.A. |

FIG. 6

| Osc. number | | HP20A1D0976 | | | | | |
|---|---|---|---|---|---|---|---|
| | | 827 | 828 | 829 | 830 | 831 | 832 |
| OPERATING DUTY | | CO | CO | CO | CO | CO | CO |
| TEST VOLTAGE (RELATIVE TIME) | kV | 2.0 | 2.0 | 2.0 | 2.0 | 2.0 | 2.0 |
| | | 3.0 | 2.0 | 2.0 | 2.0 | 2.0 | 2.0 |
| | | 2.0 | 2.0 | 2.0 | 2.0 | 2.0 | 2.0 |
| TEST CURRENT | A | 82.3 | 82.3 | 82.3 | 82.3 | 82.3 | 82.3 |
| | | 82.0 | 82.0 | 82.0 | 82.0 | 82.0 | 82.0 |
| | | 82.2 | 82.2 | 82.2 | 82.2 | 82.2 | 82.2 |
| ARCING TIME | ms | 2.1 | 3.7 | 6.2 | 1.4 | 0.9 | 3.4 |
| | | 14.8 | 0.9 | 3.6 | 14.2 | 6.1 | 0.7 |
| | | 12.8 | 6.2 | 8.7 | 4.1 | 11.2 | 6.1 |
| BREAK TIME | ms | 3 731 | 3 715 | 3 739 | 3 715 | 3 704 | 3 749 |
| | | 2 743 | 3 713 | 3 736 | 3 727 | 3 710 | 3 747 |
| | | 3 741 | 3 718 | 3 742 | 3 717 | 3 715 | 3 752 |
| PEAK VALUE OF TRV | kV | -5.5 | -5.7 | 5.7 | -5.5 | 5.5 | -5.6 |
| | | 5.4 | 3.4 | -4.6 | 5.3 | 5.7 | 3.4 |
| | | -5.6 | 5.5 | -5.6 | 5.7 | 5.1 | 5.0 |
| SUPPLIED VOLTAGE.CLOSING(DC) | V | 106.3 | 106.3 | 105.3 | 106.3 | 105.3 | 105.3 |
| SUPPLIED VOLTAGE.OPENING(DC) | V | 106.3 | 106.3 | 105.3 | 106.3 | 105.3 | 105.3 |
| GAS PRESSURE(gauge) | MPa | 0.65 | 0.65 | 0.65 | 0.65 | 0.65 | 0.65 |
| OPERATING PRESSURE(gauge) | MPa | N.A. | N.A. | N.A. | N.A. | N.A. | N.A. |

FIG. 7

EARTHING SWITCH

BACKGROUND

1. Field

The present disclosure relates to an earthing switch capable of ensuring sufficient switching performance regardless of a type of insulating gas.

2. Description of Related Art

Gas Insulated Switchgears (GISs) are power switchgears used in indoor and outdoor power plants or substations and include a main bus, a disconnecting switch (DS), an earthing switch (ES), a current transformer (CT), a bushing (gas to air bushing), a control box, etc.

Here, the earthing switch is a kind of switch that is important for an operation of power equipment, which earths an electric path to the ground when the electric path is examined and repaired. The earthing switch is generally provided together with a driving device for driving the earthing switch so that the earthing operation is performed by driving the driving device.

FIG. 1 illustrates an example of an earthing switch according to the related art. A conductor 9 is coupled to an insulation spacer installed in an enclosure 1 and a fixed contact part 10 is coupled to the conductor, so that the fixed contact part is installed inside the enclosure. A movable contact part 20' connected to a ground terminal 3 is disposed above the fixed contact part, and the movable contact part is moved up and down to be brought into contact with and separated from the fixed contact part, thereby switching a contact point.

Meanwhile, as $SF_6$ (sulfur hexafluoride) gas used as an insulating gas in a gas insulated switchgear has been classified as a representative greenhouse gas, a gas insulated switchgear that does not use SF6 gas has been required. Accordingly, a gas insulated switchgear using eco-friendly gases has been developed to replace the $SF_6$ gas.

However, since insulation characteristics of the eco-friendly gases are only ⅓ or less compared to the $SF_6$ gas, there is a problem in that switching performance varies depending on the type of the insulating gas in the earthing switch described above.

SUMMARY

An aspect of the present disclosure may provide an earthing switch capable of ensuring sufficient switching performance regardless of a type of insulating gas.

According to an aspect of the present disclosure, an earthing switch may include: a fixed contact part fixed in an enclosure; a movable contact part disposed to face the fixed contact part, having a hollow portion formed therein, and having one end portion connected to a driving device and driven by the driving device so that the other end portion thereof is connected to or separated from the fixed contact part; and a piston part located in the hollow portion and moving relative to the movable contact part, wherein the hollow portion extends in a longitudinal direction of the movable contact part, and both end portions of the hollow portion are formed to be open in the longitudinal direction.

BRIEF DESCRIPTION OF DRAWINGS

The above and other aspects, features and other advantages of the present disclosure will be more clearly understood from the following detailed description taken in conjunction with the accompanying drawings, in which:

FIG. 6 is a table showing results of testing the earthing switch according to the related art of FIG. 1 using $SF_6$ gas; and FIG. 7 is a table showing results of testing the earthing switch according to the first exemplary embodiment of the present disclosure using an eco-friendly gas.

DETAILED DESCRIPTION

Exemplary embodiments of the present disclosure will now be described in detail with reference to the accompanying drawings.

Figure 2:
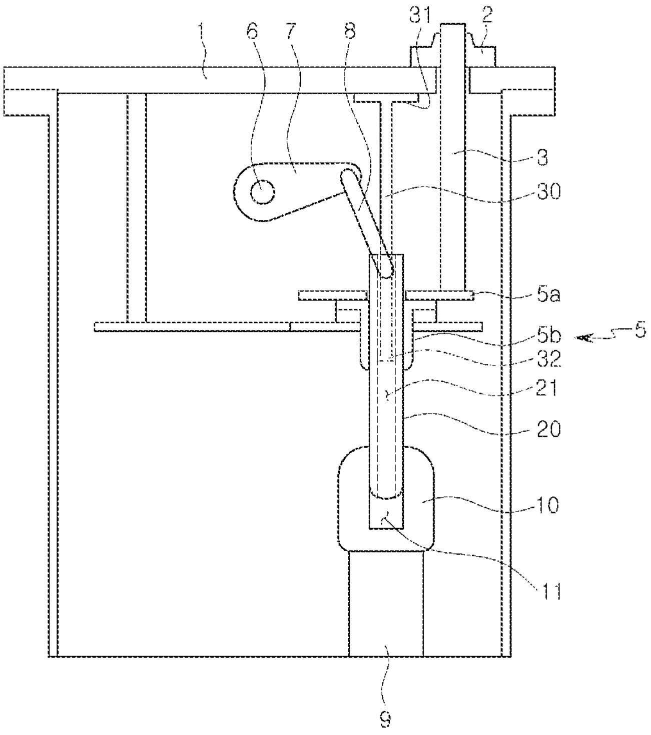
FIG. 2 is a view illustrating a closed state of an earthing switch according to a first exemplary embodiment in the present disclosure.
Figure 3:
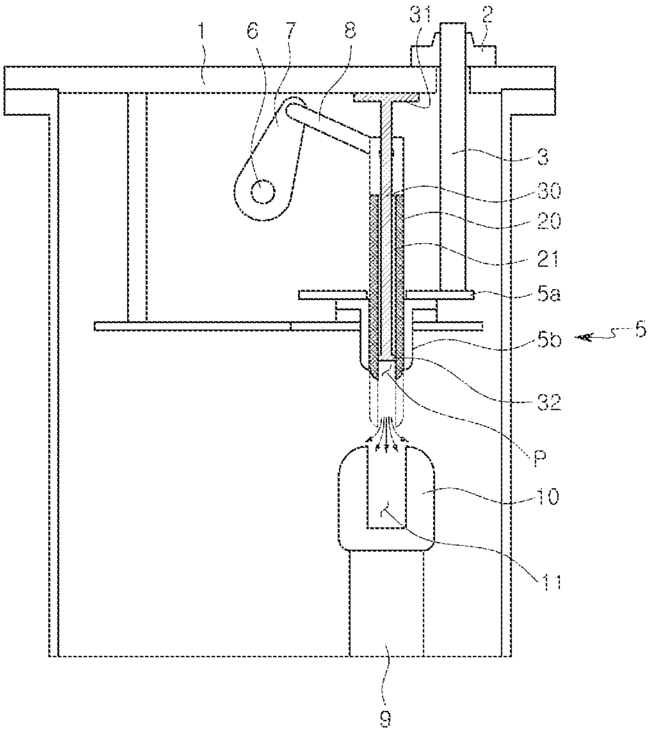
FIG. 3 is a cross-sectional view illustrating an open state of an earthing switch according to the first exemplary embodiment in the present disclosure shown in FIG. 2.

FIG. 2 is a view illustrating a closed state of an earthing switch according to a first exemplary embodiment in the present disclosure, and FIG. 3 is a cross-sectional view illustrating an open state of an earthing switch according to the first exemplary embodiment in the present disclosure shown in FIG. 2.

For example, the earthing switch according to the first exemplary embodiment in the present disclosure may be installed in an enclosure 1 of a gas insulated switchgear.

The enclosure 1 is filled with insulating gas having insulating power therein, and a ground terminal 3 may be disposed on one side of the enclosure. The ground terminal is formed to be elongated, and one end protrudes to the outside of the enclosure and the other end may be coupled to a housing 5 fixedly mounted inside the enclosure.

Here, as the insulating gas, at least one of a gas mixture of approximately 5 mol % of heptafluoroisobutyronitrile ($(CF_3)_2CFCN$) and 95 mol % of carbon dioxide ($CO_2$) or dry air may be used, for example.

An insulating member 2 is interposed between the enclosure 1 and the ground terminal 3 to insulate the enclosure and the ground terminal.

The housing 5 includes a flange portion 5*a* fixedly coupled to an end portion of the ground terminal 3 and a body portion 5*b* extending from the flange portion, and a movable contact part 20 passes through the body portion and is installed to reciprocate.

The housing 5 may be formed of a conductive material, such as metal, so that the ground terminal 3 and the movable contact part 20 are conducted with each other.

In the enclosure 1, a driving device (not shown) is installed, and a main shaft 6 performing rotating movement is connected to the driving device for generating driving force by an operator's operation. The driving device may include a lever for a manual operation or a motor for an electrical operation.

One side of a first link 7 is fixedly mounted on the main shaft 6. One end of a second link 8 is rotatably connected to the other side of the first link, and the other end of the second link may be rotatably connected to one end portion of the movable contact part 20. At least one of the first link and the second link is preferably formed of an insulating material.

Meanwhile, an insulation spacer (not shown) is installed in the enclosure 1, and a conductor 9 is coupled to the insulation spacer. By coupling a fixed contact part 10 to the conductor, the fixed contact part may be installed to be located inside the enclosure.

As shown in FIGS. 2 and 3, the earthing switch according to the first exemplary embodiment in the present disclosure may include the fixed contact part 10, the movable contact part 20, and a piston part 30.

As described above, the fixed contact part 10 is installed to be fixed to the conductor 9 inside the enclosure 1, and an opening groove 11 open to one side may be formed.

The movable contact part 20 is installed to reciprocate through the body portion 5*b* of the housing 5 inside the enclosure 1, and may be disposed in series to face the fixed contact part 10. One end portion of the movable contact part may be connected to a driving device (not shown) via the second link 8, the first link 7, and the main shaft 6 to receive driving force.

The other end portion of the movable contact part 20 may be inserted into the opening groove 11 of the fixed contact part 10. When the end portion of the movable contact part is inserted into the opening groove, the movable contact part may contact the fixed contact part and be physically and electrically connected. Thus, the movable contact part and the fixed contact part may be conducted.

Conversely, when the end portion of the movable contact part 20 come out of the opening groove 11 of the fixed contact part 10 and are separated from each other, the electrical connection between the movable contact part and the fixed contact part is released, and thus, conduction between the movable contact part and the fixed contact part may be interrupted.

In the earthing switch according to the first exemplary embodiment in the present disclosure, a hollow portion 21 is provided inside the movable contact part 20 so that the movable contact part may be formed as a substantially tubular member. The hollow portion may extend in a longitudinal direction of the movable contact part, and both end portions of the hollow portion in the longitudinal direction may be formed to be open.

In addition, the earthing switch according to the first exemplary embodiment in the present disclosure may include a piston part 30 fixed to the enclosure 1, is located in the hollow portion 21 of the movable contact part 20, and moves relatively with respect to the movable contact part reciprocating by driving force of the driving device.

The piston part 30 is a substantially rod-shaped member, and has one end provided with a support portion 31 to be mounted on a member fixed to the enclosure 1 or the inside of the enclosure and the other end provided with an extension 32 extending laterally to airtightly contact an internal surface of the hollow portion of the movable contact part 20.

The piston part 30 may include at least partially include polytetrafluoroethylene (PTFE) or a combination of PTFE and metal.

For example, at least the extension 32 may be formed of PTFE for airtight contact with respect to the internal surface of the hollow portion of the movable contact part 20 and smooth movement and lubrication at the same time. In addition, in order to secure an elastic section for preventing permanent deformation of the piston part, at least a portion of the piston part 30 or the support portion 31 may be formed of PTFE or a material as a combination of PTFE and metal.

When the movable contact part 20 reciprocates by driving force of the driving device, the extension 32 of the piston part 30 may relatively move in the longitudinal direction of the movable contact part and the hollow portion in the hollow portion 21.

At this time, there is a relationship of 1:1 to 0.7 between an inner diameter of the movable contact part 20, that is, a diameter of the hollow portion, and an outer diameter of the extension 32 of the piston part 30.

When the movable contact part and the fixed contact part are separated and the piston part moves relative to the movable contact part and causes puffing to blow the insulating gas in the hollow portion, an insulating gas should not be lost to a gap between an inner diameter of the movable contact part 20 and an outer diameter of the expansion 32.

For example, if the ratio between the inner diameter of the movable contact part 20 and the outer diameter of the extension 32 is less than 1:0.7, there is a high possibility that the insulating gas may leak into the gap between the inner diameter of the movable contact part 20 and the outer diameter of the extension 32 to be lost.

As such, the insulating gas should not leak to the gap between the inner diameter of the movable contact part 20 and the outer diameter of the extension 32, so that the insulating gas may be effectively circulated around the contacts to recover breaking performance.

In addition, as the movable contact part 20 moves relative to the piston part 30 and the extension 32 located in the hollow portion 21 thereof, the movable contact part may be guided in a movement path thereof by the piston part, and accordingly, linear movability of the movable contact part may be improved.

Due to this, displacement of the movable contact part 20 during movement may be prevented, and, for example, foreign matter occurring when the movable contact part contacts or collides with other components therearound may be reduced.

Hereinafter, the operation and effect of the earthing switch according to the first exemplary embodiment in the present disclosure will be described.

First, when an operator operates the driving device (not shown), the main shaft 6 is rotated by the driving device, and the first link 7 connected to the main shaft rotates about the main shaft, for example, in a clockwise direction in the drawing.

As the first link 7 rotates, the second link 8, one end of which is connected to the first link, moves downwardly in the drawing, for example, and the movable contact part 20 connected to the other end of the second link moves downwardly and is connected to the fixed contact part 10.

Accordingly, as shown in FIG. 2, the earthing switch is placed in a closed state, and current may be conducted from the ground terminal 3 to the conductor 9 in the enclosure 1.

When the operator reversely operates the driving device, the main shaft 6 is rotated in a reverse direction by the driving device, and the first link 7 connected to the main shaft rotates about the main shaft, for example, in a counterclockwise direction in the drawing.

As the first link 7 rotates in the reverse direction, the second link 8, one end of which is connected to the first link, moves upwardly in the drawing, for example, and the movable contact part 20 connected to the other end of the second link also moves upwardly, so that the connection of the movable contact part 20 to the fixed contact part 10 is released.

As shown in FIG. 3, by moving the movable contact part 20 in a direction away from the fixed contact part 10, the earthing switch is placed in an open state. At this time, not only the fixed contact part but also the piston part 30 does not move, and only the movable contact part may move in the longitudinal direction.

When the movable contact part 20 and the fixed contact part 10 are separated from each other in this manner, an arc is generated between the movable contact part and the fixed contact part. At the same time, high-temperature insulating gas heated by the arc may flow into a puffer chamber P partitioned by the hollow portion 21 of the movable contact part 20 and the extension 32 of the piston part 30.

Subsequently, when the movable contact part 20 moves further away from the fixed contact part 10, the volume of the hollow portion 21 of the movable contact part 21, that is, the puffer chamber P, is reduced by the piston part 30 and the insulating gas in the puffer chamber is pressed, so that the insulating gas flows out of the hollow portion of the movable contact part and is sprayed toward the arc.

Figure 4:
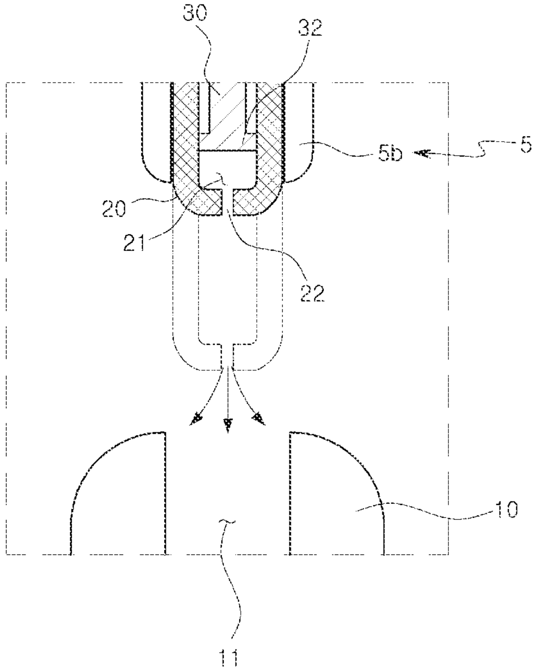
FIG. 4 is a cross-sectional view of main parts of an earthing switch according to a second exemplary embodiment in the present disclosure in an open state.
Figure 5:
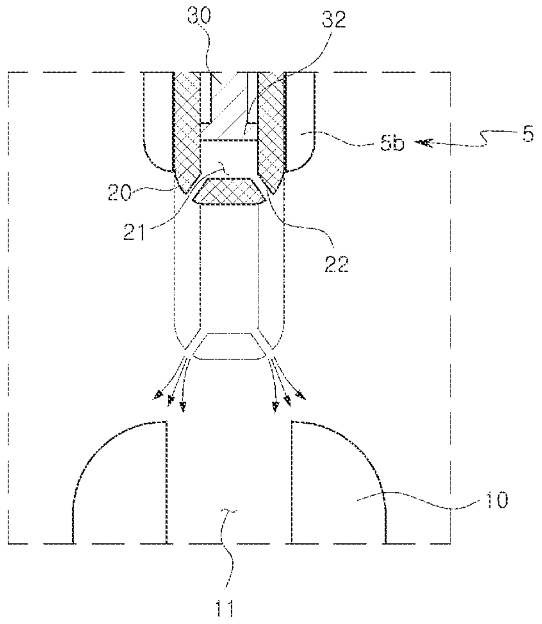
FIG. 5 is a cross-sectional view of main parts of an earthing switch according to the second exemplary embodiment in the present disclosure in an open state as a modified example.

FIG. 4 is a cross-sectional view of main parts of an earthing switch according to a second exemplary embodiment in the present disclosure in an open state, and FIG. 5 is a cross-sectional view of main parts of an earthing switch according to the second exemplary embodiment in the present disclosure in an open state as a modified example.

In the second exemplary embodiment in the present disclosure, only the structure of the other end of the movable contact part 20 is different, and the rest of the components are the same as those of the first exemplary embodiment described above. Therefore, in describing the earthing switch according to the second exemplary embodiment in the present disclosure, the same reference numerals are given to the same components as those of the earthing switch according to the first exemplary embodiment described above, and detailed descriptions of the configurations and functions will be omitted.

In the earthing switch according to the second exemplary embodiment in the present disclosure, the hollow portion 21 is provided inside the movable contact part 20 so that the movable contact part 20 may be formed as a substantially tubular member. The hollow portion may extend in the longitudinal direction of the movable contact part, and both end portions of the hollow portion in the longitudinal direction may be formed to be open.

Here, a wall portion separating the hollow portion 21 and the outside may be formed at the other end of the movable contact part 20, and at least one through-hole 22 may be formed in the wall portion. The through-hole has a diameter smaller than the inner diameter of the movable contact part.

For example, there is a relationship of 1:0.008 to 0.3 between a cross-sectional area of the inner diameter of the movable contact part 20 and a cross-sectional area of the through-hole 22.

As an inlet through which gas is injected is narrower during puffing, an injection angle may increase, so that effective breaking performance may be recovered, but if the ratio between the cross-sectional area of the inner diameter of the movable contact portion 20 and the cross-sectional area of the through-hole 22 exceeds 1:0.3, the injection angle may be narrowed and it may be difficult to recover effective breaking performance.

Meanwhile, if the ratio between the cross-sectional area of the inner diameter of the movable contact part 20 and the cross-sectional area of the through-hole 22 is less than 1:0.008, the inlet through which gas is injected may be too narrow, acting as a damper when the contacts move to hinder the operation of the movable contact part.

Therefore, it is preferable to have an appropriate area ratio between the inner diameter of the movable contact part and the through-hole 22 in consideration of the operation of the device and recovery of breaking performance.

Due to this through-hole 22, when the insulating gas flowing into the puffer chamber P flows out of the hollow portion 21 of the movable contact part 20 and is sprayed toward the arc, the insulating gas may flow to circulate advantageously toward arc extinguishing.

In FIG. 4, it can be seen that one through-hole 22 is formed in a direction parallel to the longitudinal direction of the hollow portion 21 and the movable contact part 20, and in FIG. 5, it can be seen that a plurality of through-holes 22 are formed in an oblique direction inclined with respect to the longitudinal direction of the hollow portion and the movable contact part.

When the plurality of through-holes 22 are formed as shown in FIG. 5, for example, there is a relationship of 1:0.008 to 0.2 between a cross-sectional area of the inner diameter of the movable contact portion 20 the sum of the cross-sectional areas of the through-holes 22.

As described above, in the earthing switch according to the present disclosure, when the movable contact part and the fixed contact part are separated, the piston part moves relative to the movable contact part to cause puffing for the insulating gas in the hollow portion to blow out, so that breaking performance of the insulating gas around the contacts may be recovered regardless of the type of insulating gas and switching performance of the earthing switch may be improved.

In addition, in the earthing switch according to the present disclosure, since the insulating gas heated by the arc may flow into the hollow portion of the movable contact part and then be discharged again by the piston part, the high-temperature insulating gas may not stay and flow between the contacts, and accordingly, there is an advantage in that safety and durability of the earthing switch are excellent.

In addition, according to the earthing switch according to the present disclosure, the movable contact part provided with the hollow portion may perform the role of a puffer cylinder without adding a separate puffer cylinder, thereby simplifying the structure of the earthing switch and it is possible to reduce manufacturing costs and maintain stable operating characteristics.

Figure 1:
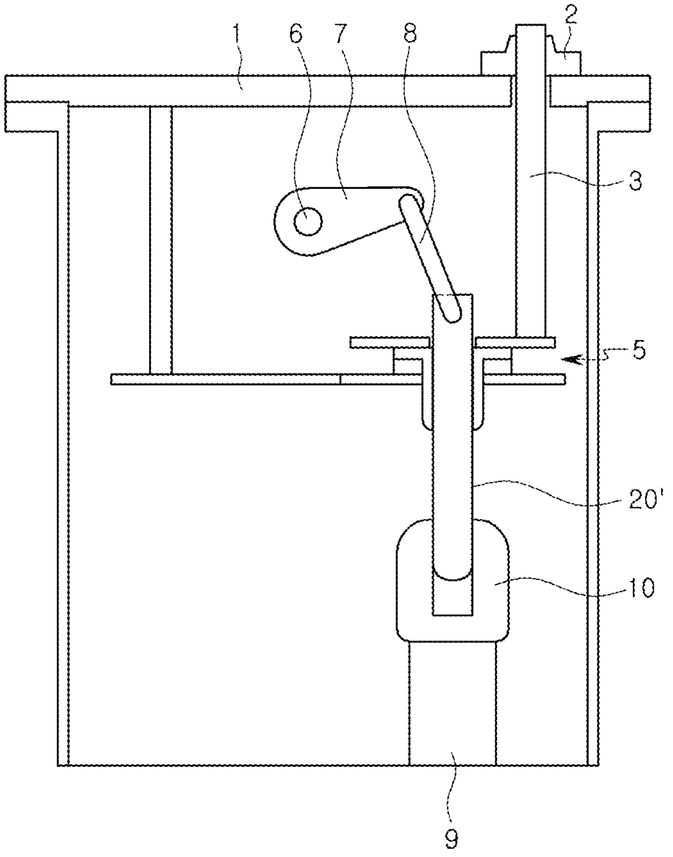
Prior Art FIG. 1
FIG. 1 is a view illustrating a closed state of an earthing switch according to the prior art.

FIG. 6 is a table showing results of testing the earthing switch according to the related art of FIG. 1 using $SF_6$ gas and FIG. 7 is a table showing results of testing the earthing switch according to the first exemplary embodiment in the present disclosure using an eco-friendly gas.

These two tests were conducted by the present applicant at the request of an authorized institution (Korea Electric Research Institute), and all the tests were performed according to test items of the test standard (IEC 62271) of the International Electrotechnical Commission (IEC).

For example, in both tests, a test voltage of 2 kV, a test current of 80 A, a transient recovery voltage (TRV) peak value of 4.5 kV, and a constant supply voltage are satisfied.

First, referring to FIG. 6, since the earthing switch of the related art was tested using $SF_6$ gas, most of the test items were determined to be suitable. In particular, referring to an arc time, the test breaking was completed in less than about 20 ms, securing the performance.

When eco-friendly gas replacing $SF_6$ gas, for example, a gas mixture of approximately 5 mol % of heptafluoroisobutyronitrile ($(CF_3)_2CFCN$) and 95 mol % of carbon dioxide ($CO_2$), was applied to the earthing switch of the related art, an arc was not extinguished in the earthing switch of the related art having the configuration shown in FIG. 1 even if the arc time exceeded 100 ms, confirming that the earthing switch of the related art using the eco-friendly gas has very insufficient switching performance or lacks such performance.

The table of FIG. 7 shows results of applying the aforementioned eco-friendly gas, for example, the gas mixtures of approximately 5 mol % of heptafluoroisobutyronitrile ($(CF_3)_2CFCN$) and 95 mol % of carbon dioxide ($CO_2$) to the earthing switch according to the first exemplary embodiment in the present disclosure, similarly, referring to an arc time, among the test items, it can be seen that the test breaking was completed in less than 20 ms, securing the performance.

As a result, in the earthing switch according to an exemplary embodiment in the present disclosure, an advantage in that switching performance may be sufficiently secured regardless of the type of insulating gas is obtained.

While exemplary embodiments have been shown and described above, it will be apparent to those skilled in the art that modifications and variations could be made without departing from the scope of the present disclosure as defined by the appended claims.

What is claimed is:

1. An earthing switch comprising:

a fixed contact part fixed in an enclosure;

a movable contact part disposed to face the fixed contact part, having a hollow portion formed therein, and having one end portion connected to a driving device and driven by the driving device so that the other end portion thereof is connected to or separated from the fixed contact part; and a piston part located in the hollow portion and moving relative to the movable contact part, wherein the hollow portion extends in a longitudinal direction of the movable contact part, both end portions of the hollow portion are formed to be open in the longitudinal direction, wherein a wall portion separating the hollow portion and an outside is formed at the other end portion of the movable contact part, and wherein a plurality of through-holes are formed in the wall portion in an oblique direction inclined with respect to the longitudinal direction of the movable contact part.

2. The earthing switch of claim 1, wherein an opening groove formed to be open to one side is formed in the fixed contact part, and the other end portion of the movable contact part is insertable into the opening groove.

3. The earthing switch of claim 1, wherein, in the piston part, a support portion is formed at one end and mounted on a member fixed to the enclosure or inside of the enclosure and an extension extending laterally is formed at the other end to contact an internal surface of the hollow portion.

4. The earthing switch of claim 3, wherein the piston part at least partially includes polytetrafluoroethylene (PTFE) or a material in which PTFE and a metal are combined.

5. The earthing switch of claim 3, wherein, when the movable contact part and the fixed contact part are separated, the piston part moves relative to the movable contact part and causes puffing to blow an insulating gas in the hollow portion.

6. The earthing switch of claim 3, wherein a ratio between an inner diameter of the movable contact part and an outer diameter of the expansion of the piston part is 1:1 to 0.7.

7. The earthing switch of claim 1, wherein a ratio between a cross-sectional area of an inner diameter of the movable contact and a sum of cross-sectional areas of the through-holes is 1:0.008 to 0.3.

8. The earthing switch of claim 1, wherein an inside of the enclosure is filled with an insulating gas, and the insulating gas includes at least one of a gas mixture of heptafluoroisobutyronitrile ($(CF_3)_2CFCN$) and carbon dioxide ($CO_2$), or dry air.

* * * * *